Feb. 28, 1956 P. M. HENKES 2,736,241

COPY TABLE AND MOUNTING THEREFOR

Filed Sept. 23, 1953 4 Sheets-Sheet 1

INVENTOR:

Peter M. Henkes

BY Peck + Peck

ATTORNEYS

Feb. 28, 1956 P. M. HENKES 2,736,241

COPY TABLE AND MOUNTING THEREFOR

Filed Sept. 23, 1953 4 Sheets-Sheet 2

INVENTOR:

Peter M. Henkes

BY Peck + Peck

ATTORNEYS.

Feb. 28, 1956  P. M. HENKES  2,736,241

COPY TABLE AND MOUNTING THEREFOR

Filed Sept. 23, 1953  4 Sheets-Sheet 3

INVENTOR:

Peter M. Henkes

BY Peck + Peck

ATTORNEYS.

INVENTOR:
Peter M. Henkes
BY Peck + Peck
ATTORNEYS

United States Patent Office 2,736,241

Patented Feb. 28, 1956

2,736,241

COPY TABLE AND MOUNTING THEREFOR

Peter M. Henkes, Racine, Wis., assignor to George Gorton Machine Co., Racine, Wis., a corporation of Wisconsin Application September 23, 1953, Serial No. 381,844

9 Claims. (Cl. 90—13)

My present invention relates to a copy table and mounting therefor for engraving and the like reproducing machines; and the nature and objects of the invention will be readily apparent to and understood by those skilled in the art to which this invention relates in the light of the following explanation and detailed description of the accompanying drawings illustrating one possible embodiment or mechanical expression of the invention which I now believe to be a preferred one, from among various other embodiments, designs, forms, constructions, arrangements and combinations of which the invention is capable within the broad spirit and scope thereof as defined by the claims hereto appended.

The invention is particularly directed to those types of engraving machines in which the machine provides a work table and a copy table with movements of a tracer over a pattern positioned on the copy table being transmitted through the movements of a pantograph linkage to an engraving tool such as a rotary cutter which is moved by the pantograph linkage over a workpiece mounted on the work table, as cutting or engraving movements in scaled reproduction of the movements of the tracer over the pattern. In this general type of engraving or reproducing machine organization the pattern table is mounted for vertical adjustments upwardly and downwardly by the operator through an elevating screw or the like mechanism and the height or vertical position to which such copy table is adjusted for any particular reproduction or engraving job is usually left to the eye and judgment of the operator without precision, scale measured adjustments of the table.

One of the primary objects of my invention is to eliminate adjustment of such a copy table solely by the eye and judgment of the operator by providing a copy table and a mounting therefor by which the copy table may be moved upwardly and downwardly by micrometer scale measured, precision adjustments by an operator.

Another object is to provide an improved copy table mounting which includes and incorporates an operator controlled micrometer scale carrying dial member as a component of the adjusting mechanism, for precision measuring of the vertical, linear adjustment upwardly or downwardly of the copy table on such mounting.

Another object is to provide an improved, vertically adjustable copy table mounting of stronger and more rigid design and construction to thereby provide a support for the copy table having minimum vibration and maximum positional stability.

A further object is to provide an improved form of copy table and seating and mounting attachment therefor on a vertically adjustable mounting structure for such table to insure minimum possibility of displacement or distortion of the table and its adjustable mounting structure in any position of adjustment thereof under the normal operating conditions of use of such table.

And a further object is to provide a copy table mounting structure which includes fixed structural elements thereof as rigid components of an integral rigid mounting base and pantograph supporting column of an engraving or reproducing machine.

With the foregoing and various other objects, features and results in view which will be readily apparent from the following detailed description and explanation, my invention consists in certain novel features in design and construction and in combinations and sub-combinations of parts and elements, all as will be more fully referred to and specified hereinafter.

Referring to the accompanying drawings in which similar reference characters refer to corresponding parts throughout the several figures thereof:

As an example I have shown an embodiment of my invention adapted to and incorporated in a particular design of an engraving machine of the 3-dimensional, pantograph type. It is to be understood, however, that the various features of the copy table and its vertically adjustable copy table mounting structure and adjusting mechanism of the invention as expressed in this particular example, may be embodied in other combinations and structural expressions and with other types of engraving or reproducing machines in which a vertically adjustable copy table is required.

Figure 1:
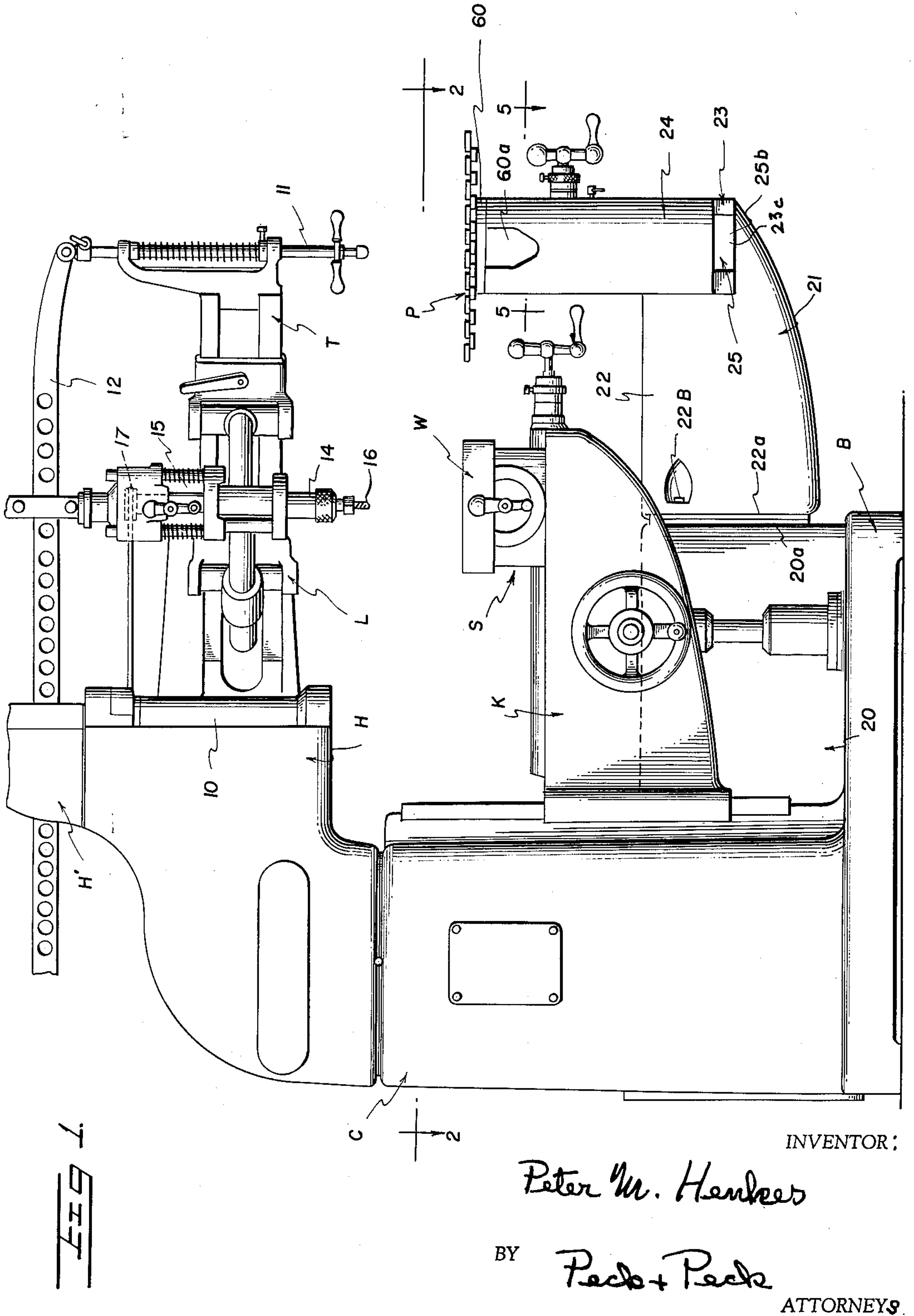
Fig. 1 is a view in side elevation of a 3-dimensional engraving machine of the pantograph type embodying and incorporating therein a vertically adjustable mounting and copy table thereon of my invention.

The engraving machine illustrated in Fig. 1, is of a widely used type familiar in the art. This machine includes a main base in the general form of a plate or platform structure B from the left hand side (when facing the machine) of the rear portion of which there extends vertically upward a column structure C having the forwardly extending head portion H at the upper end portion thereof. At the forward side of the column C and below the head H, there is mounted a vertically adjustable knee K having slidable engagement with suitable vertical ways at the forward side of the column. A saddle S is mounted on the upper side of knee K for straight line movements in either direction thereon independently thereof inwardly and outwardly of the machine, that is, toward and from column C. On the upper side of the saddle S a work table W is slidably mounted for movements in either direction along a straight line path perpendicular to the path of movements of saddle S on knee K, that is, across the machine, all in a more or less conventional manner familiar in the art. In this type of engraving machine it is necessary that a copy table be provided for mounting thereon the pattern or master to be reproduced by the machine on a workpiece mounted on the work table W. Such a pattern table is usually and preferably mounted in a horizontally disposed position forwardly and to the right-hand side of the work table W at a location readily accessible to the hand and eye of an operator for tracing a pattern or master positioned on the upper, exposed side of the table. In this instance a copy table P together with a vertically adjustable mounting therefor which embodies my present invention is incorporated in the engraving machine of the example to provide the pattern table requirements for that machine.

In the example machine which is of the 3-dimensional, pantograph type, a pantograph component L of the jointed-link, parallelogram type is pivotally mounted and hung on and from the forward side of the head portion H of column C for swinging about a vertical axis provided by the pivot spindle 10 on head H, with the pantograph linkage L being extended forwardly from and in horizontally disposed position over the work table W. The pantograph component L mounts thereon and includes a tracer arm T which extends and is positioned over the copy table P and which mounts in position above that table the vertically disposed tracer 11. The tracer 11 is mounted in tracer arm T for vertical axial movements thereon independently thereof toward and from the pattern table. Tracer 11 is connected at its upper end with the forward end of a so-called modelling or "3rd-dimension" bar 12 which has a universal pivotal relation at its inner end length with a cap member H' on the upper end of head portion H of the column C. The pantograph component L mounts on one of the jointed links thereof a rotary cutter spindle 14 which is suitably journaled in vertically disposed position located above the work table W in a cutter head 15. The cutter head and cutter spindle arrangement is such that the spindle 14 is vertically axially movable upwardly and downwardly relative to the pantograph component P and toward and from the work table W. The cutter head and spindle assembly is pivotally coupled at its upper end to the modelling bar 12. The cutter spindle 14 is thus raised and lowered by the bar 12 as the latter is raised and lowered with the vertical movements of the tracer T over the surface contour of a pattern or master on the copy table P. Any suitable power drive may be provided for rotating the cutter spindle 14, such drive being of the belt type in this example and being identified generally by the reference character 17 in Fig. 1.

In engraving operations with the machine of the type illustrated in Fig. 1, the desired pattern or master (not shown) is secured in position on the upper side of the copy table P below the tracer spindle 11, and the workpiece (not shown) on which the pattern on table P is to be reproduced is mounted and secured on table W. Depending upon the size of the workpiece and other factors, the pattern table P is adjusted vertically to the required position at which a cutting or engraving tool 15 mounted on the cutter spindle 12 has proper cutting engagement and depth with a workpiece on the work table W. The operator then moves the tracer 11 over and traces the pattern on the copy table P with the movements of the tracer in 3 dimensions being transmitted in scaled reproduction in 3 dimensions to the cutter spindle 14 and its cutting tool 16 so that there is reproduced on the workpiece a scaled reproduction in 3 dimensions of the pattern or master on the copy table. It is not considered necessary to herein set forth in detail the operation and functioning of this type of 3-dimensional engraving machine, as a full explanation and description thereof may be obtained by reference to the U. S. Patents 2,128,611 and 2,161,709, issued to me as patentee, dated August 30, 1938, and June 6, 1939, respectively. Suffice it to state that with 3-dimensional work where the reproduction is being made in 3-dimensions from a master, as well as for 2-dimensional reproduction, it is essential for the highest performance in efficiency and precision of reproduction that for any particular workpiece the copy table of the machine be vertically adjusted to a definite predetermined vertical position for that particular piece of work, and that the copy table be rigidly supported against displacement or deflection from its horizontal plane in any position of adjustment thereof. Heretofore in the art it has been the general practice with such types of machines to provide for vertical adjustment of the copy table without provision for precision measured or micrometer sealed adjustment with the proper vertical position or elevation of the copy table for each particular workpiece being left to the judgment, skill and experience of the operator, that is to say, by guess or estimate.

In the engraving machine of the example type as illustrated in Fig. 1 and which includes a copy table and its mounting and micrometer measured adjusting mechanism of my invention incorporated therein and combined with major components of that machine, the basic supporting frame structure of the machine is comprised of the platform base B and the vertical column C integral therewith. The column structure C is located on the rear portion of base B with the vertically adjustable knee K located in position over the forward portion of the base but at the left-hand side thereof when facing the machine. In accordance with the expression of my invention presented by this example, a sub-base structure 20 in the form of a hollow box-like structure of generally rectangular cross-section is formed on and extends upwardly from the right-hand side of the base B, being in this instance an integral part of and rigid with the base and column structure of the machine. This sub-base 20 extends forwardly across the right-hand side portion of base B and terminates with its forward vertical side lying substantially in the vertical plane of the forward edge of the base B. The sub-base 20 forms, in effect, the base portion of a forwardly extending, rigid supporting arm from which the copy table P and its vertical adjusting mechanism are supported.

Figure 2:
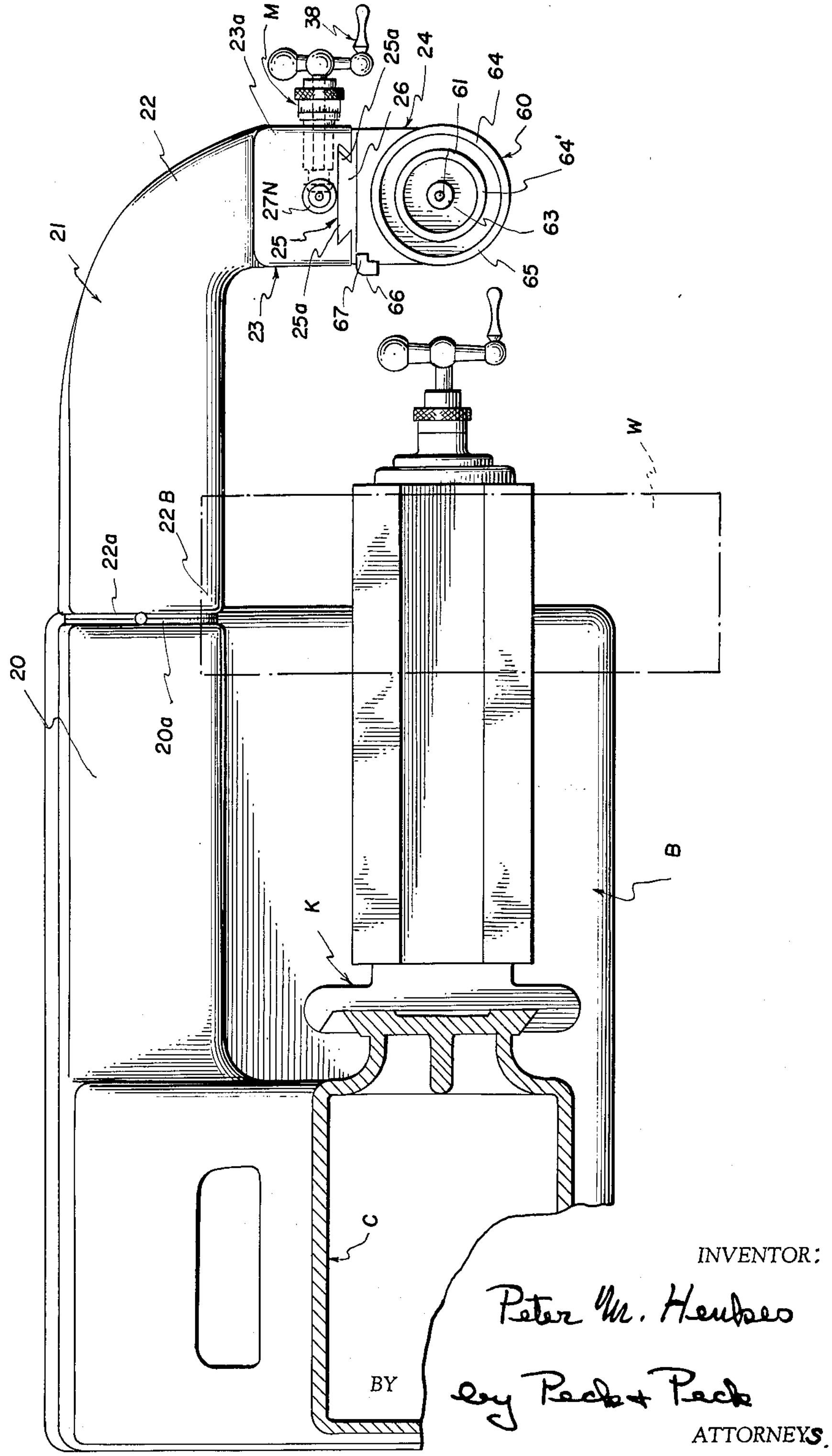
Fig. 2 is a view in horizontal section through the vertical column taken as on the line 2—2 of Fig. 1, and showing the copy table supporting arm unit and associated structure and components of the machine in top plan.
Figures 3, 4:
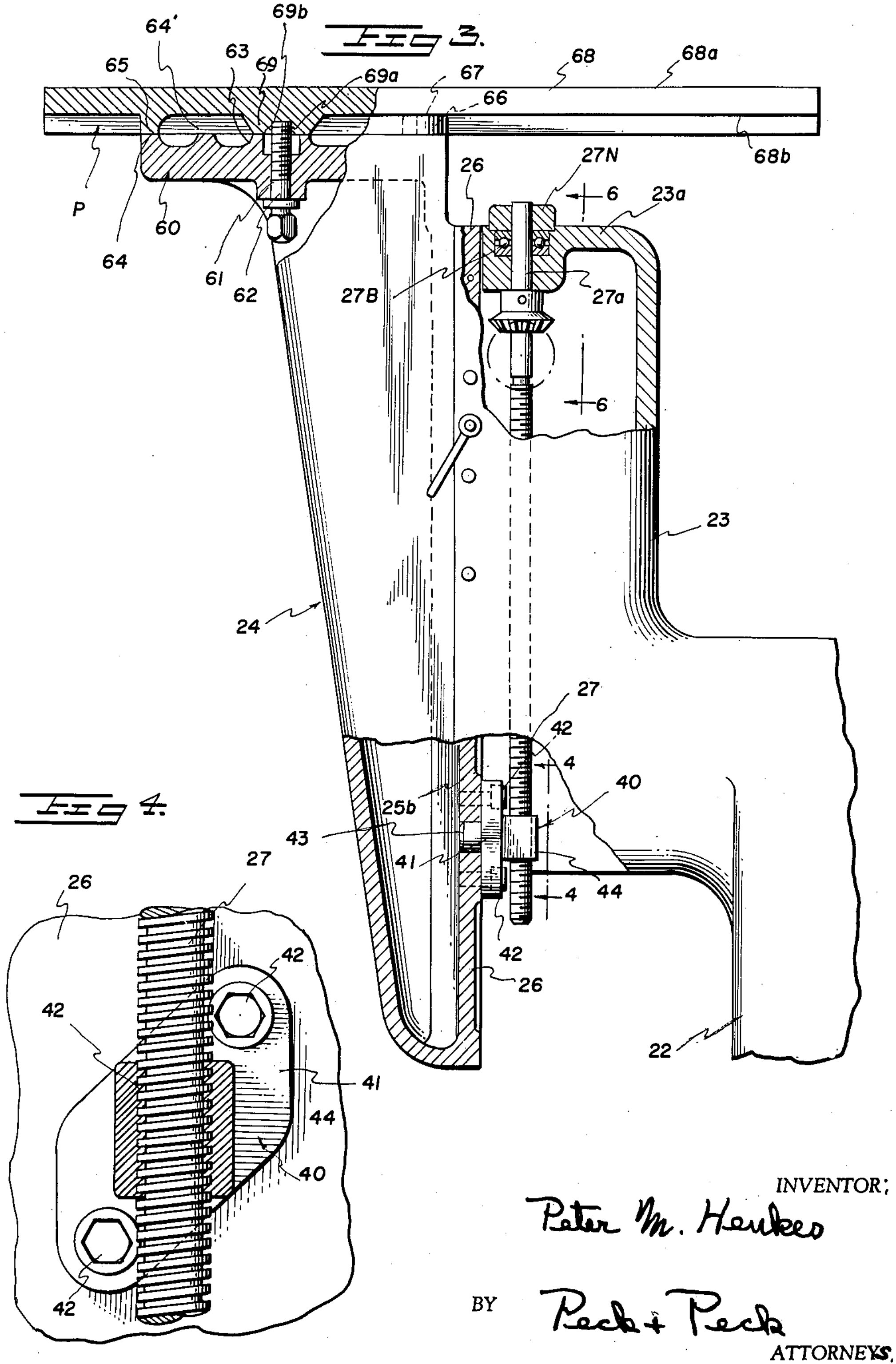
Fig. 3 is a view primarily in side elevation of the copy table supporting post and vertically adjustable copy table mounting column thereon, with portions of the post and column broken away and shown in vertical section to show portions of the vertical adjusting mechanism for the table mounting column.
Fig. 4 is a fragmentary view partly in side elevation and partly in vertical section through the elevating screw nut, taken as on the line 4—4 of Fig. 3.
Figure 5:
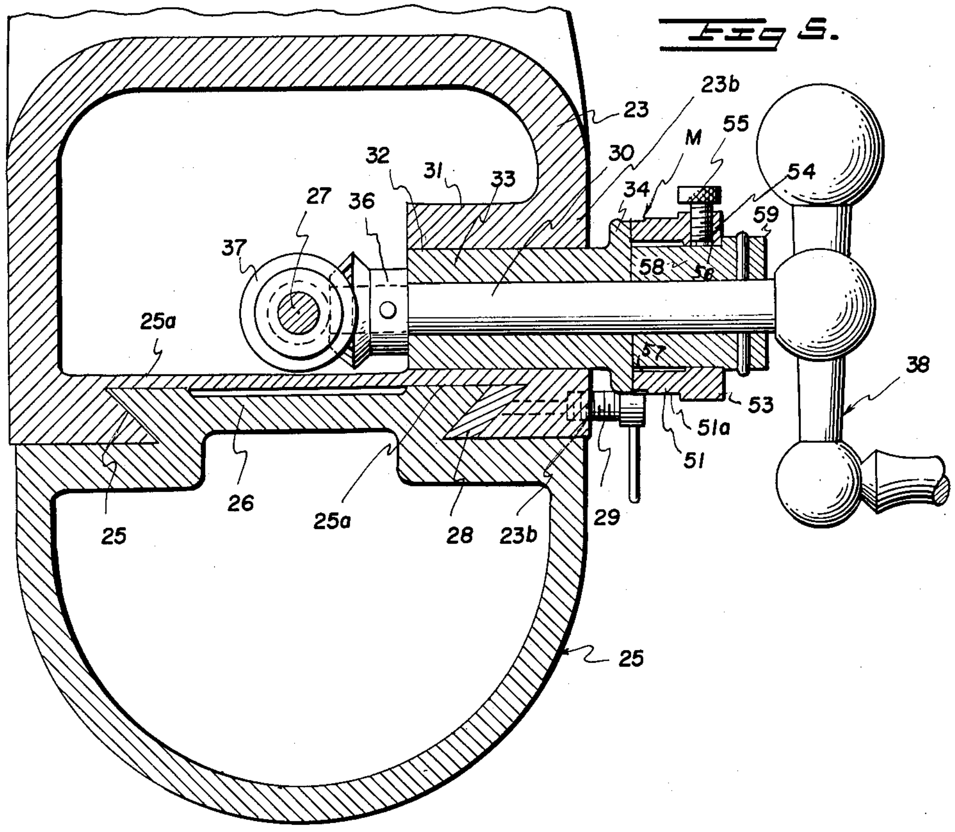
Fig. 5 is a horizontal transverse section taken as on the line 5—5 of Fig. 1.
Figure 6:
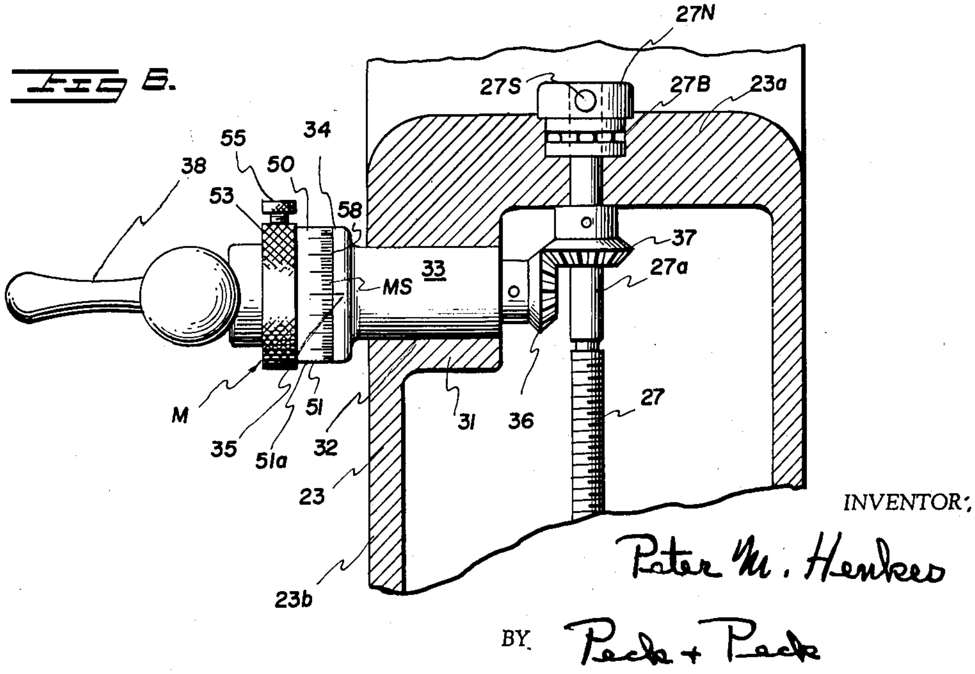
Fig. 6 is a fragmentary vertical section taken as on the line 6—6 of Fig. 3.

A copy table supporting arm unit 21 is provided for mounting on and for rigid attachment to the sub-base 20 at the forward end or front side of the sub-base. This supporting arm unit 21 in this example is formed as a single casting to include an arm member 22 having at the forward end thereof a vertically disposed post 23 which is positioned on and as an integral part of the arm member 22 with its major axis disposed perpendicular to the major axis of the arm member 22. The inner or base end **22*a* of the arm member 22 is formed for attachment and rigid mounting on and against the forward or front end wall 20*a* of the sub-base 20 with the arm member extending horizontally and forwardly from sub-base 20 in forward continuation thereof to form therewith a single rigid supporting base and arm structure. For instance, in this example the inner or base end 22*a* may have substantially the same area and plan dimensions as the forward front end 20*a* of the sub-base 20. The supporting arm unit 21 comprised of the arm member 22 and the post member 23 is mounted in assembled position in this example by bolting or otherwise rigidly attaching the base end 22*a* of the arm member 22 to the forward or front end 20*a* of the sub-base or box beam structure 20 which is formed integral and rigid with base B. Suitable attaching bolts 22B may be utilized for making such rigid mounting and attachment of supporting arm unit 21 on and to the sub-base 20**, as will be clear by reference to Fig. 1 and Fig. 2.

The post member 23 of supporting arm unit 21 is located and positioned at the inner, that is, the left-hand side of arm member 22 when facing the machine and extends vertically upwardly a distance above such arm member. It will be noted that in this example the underside of arm member 22 slopes or inclines forwardly and upwardly throughout the length of the arm member so that the forward end thereof is of less depth than the inner base end **22*a*** but with the upper surface of the arm member in the horizontal plane of the upper side surface of sub-base 20. The lower end of the post member 23 of the supporting arm unit 21 terminates and is positioned to lie in a plane which passes approximately through the under surface of the arm member 22 at the forward end thereof adjacent such post member. In other words, post member 23 preferably, although not essentially, does not depend or extend any substantial distance below the forward end of the arm member 22.

This rigidly mounted post member 23 of the supporting arm unit 21 provides the fixed member on which a vertically adjustable copy table support column 24 is vertically slidably mounted. In the specific example hereof the supporting arm unit 21, including the arm member 22 and the post member 23, is formed as an integral, hollow casting with the inner vertical side wall structure of post member 23 being formed with a vertically disposed truly perpendicular dovetail slideway 25 therein. The slideway 25 provides at opposite sides thereof the parallel, vertically disposed and spaced vertical ways 25*a*, with the side wall of the post being open therebetween to provide the vertically uninterrupted space 25*b* through the post opening into the interior thereof between ways 25*a*. The dovetail slideway 25 extends through the upper end of the post 23 and downwardly a distance along the post. In this specific example the slideway 25 with its ways 25*a* extends downwardly along the post to a location spaced above the lower end thereof with the outer side surfaces of the portion 23*c* of the wall of the post below the lower end of slideway 25 being inset a slight distance, as shown in Fig. 1. The inner vertical side wall of the table support column 24 is formed and provided with a dovetail slide 26 disposed centrally and longitudinally therealong and being complementary to the dovetail slideway in the post member 23.

In mounted and assembled position the table support column 24 is positioned in vertically disposed position on the inner side of post 23 with the dovetail slide 26 slidably received and confined in the slideway 25 so that the table support column is vertically movable upwardly and downwardly on and relative to the post 23, being constrained to movements along a truly perpendicular straight line vertical path to thereby permit of adjusting the vertical position or elevation of the copy table P which is mounted and positioned on the upper end of the support column 24. A gib 28 may be provided along one side of the slideway 25 for releasable clamping engagement with slide member 26 to lock column 24 in any position of vertical adjustment thereof on post 23. A locking screw 29 may be threaded through the side wall 23*b* of post 23 for locking gib 28 in clamping engagement.

Mechanism is provided for manual operation under selective control of an operator for vertically adjusting the copy table support column 24 upwardly and downwardly on the fixed post member 23 of the table supporting structure. In this example such mechanism includes an externally threaded elevating screw 27 which is mounted and journaled in the horizontally disposed upper end wall 23*a* of post member 23. The elevating screw 27 has a smooth walled upper end length or shank 27*a* which is journaled in a suitable bearing assembly 27B mounted in wall 23*a* of post 23 with this upper end length 27*a* of screw 27 being extended upwardly through bearing 27B and having threaded onto the upper end thereof the lock nut 27N which is secured in locked position by a set screw 27S. Thus mounted and journaled the elevating screw 27 depends in truly perpendicular position downwardly through the interior of the hollow post member 23 adjacent but spaced a distance inwardly from the dovetail slideway 25, being centered between the spaced parallel ways 25*a* of that slideway, as will be clear by reference to Fig. 2. Preferably the length of the elevating screw 27 is such that its lower end is located within the post member 23 adjacent the lower end of that member.

The elevating screw 27 is rotatable by a manually operable shaft or spindle 30 which includes and has combined therewith a micrometer dial and scale unit identified generally by the reference character M. A bearing boss 31 is provided on post member 23, as by casting the same integrally therewith. Bearing boss 31 extends inwardly in horizontally disposed position from the outer side or front wall 23*b* of post 23. The boss 31 is provided with an axial bore 32 extending horizontally therethrough with its axis perpendicular to the axis of the elevating screw 27 opposite the smooth wall upper end length or shank 27*a* of the elevating screw 27 beneath the top wall 23*a* of post 23. A bushing 33 is mounted and secured in and through bore 32 of the bearing boss 31 with this bushing being extended a slight distance outwardly beyond wall 23*b* and being formed to provide a radially outwardly extended flange 34 around the outer end thereof on which there may be suitably formed or provided an index line or mark 35 for cooperative functioning in and with the micrometer dial and scale unit M.

The elevating screw operating spindle 30 is mounted and journaled in and extending through the bushing 33 with the inner end of the spindle having mounted thereon a bevel gear 36 for rotation therewith in driving mesh with a bevel gear 37 which is pinned or otherwise fixed on the elevating screw 27 for rotation therewith. Thus, by rotating spindle 30 in one direction or the other the elevating screw 27 will be correspondingly rotated through the enmeshed set of bevel gears 36 and 37. A crank handle 38 is pinned or otherwise secured on the outer end of elevating screw operating shaft 30 for selective manual rotation in the desired direction by an operator.

The vertically movable table support column 24 mounts and carries thereon an actuating nut unit 40 which is in constant threaded engagement with the elevating screw 27 and through the medium of which the table support column 24 is raised or lowered by rotation of the elevating screw 27. This nut unit 40 includes a body or base 41 which is rigidly secured and attached in fixed position on the inner side of the support column 24, adjacent but spaced a distance inwardly, that is, upwardly from the lower end thereof in a location centrally of the dovetail slide member 26. The attachment of the nut unit 40 to the support column 24 may be, as in the present example, through the medium of threaded bolts 42 threaded into suitable tapped bores in the slide member 26. In order to accurately and precisely position the nut unit 40, it is preferable to provide a relatively large diameter dowel member 43 which fits into an accurately positioned cylindrical hole or socket formed in the slide member 26, with this dowel 43 being preferably centered between the attaching bolts 42. This nut unit 40 includes and provides a nut member 44 which in assembled position of the unit on support column 24 extends outwardly from base 41 and is provided with a vertical, internally threaded bore 45 therethrough into and through which the elevating screw 27 is threaded. By this arrangement and assembly rotation of the elevating screw 27 in one direction will raise the support column 24 along its straight line path on the vertical post member 23 while rotation of the elevating screw in the opposite direction will lower the support column along such straight line path. It will be noted that the actuating nut unit 40 which moves vertically upwardly or downwardly with the support column 24 is received in and moves freely vertically through the opening 25*b* in the inner wall of the vertical post 23 which is formed between the ways 25*a* of the dovetail slideway 25 of the post member, as referred to hereinabove.

The micrometer dial unit M includes a micrometer dial member 50 in the form of a cylindrical section collar 51 providing around the exterior thereof a truly cylindrical surface 51*a* concentric with the axis of the member and having formed thereon and therearound a micrometer scale MS comprised of the scale divisions 52 which may be engraved or otherwise suitably formed thereon. The micrometer dial member 51 is provided with a circular, knurled flange 53 therearound at the outer end or side thereof concentric therewith but of slightly greater external diameter than the external diameter of the member 51. The knurled flange 53 provides a knob for ready manual rotation and adjustment of the micrometer dial member 50 and the micrometer scale MS therearound. The knurled flange 53 is formed with a tapped bore 54 extending radially therethrough into and through which there is threaded the adjusting screw 55. The micrometer dial member 50 is formed with an axial bore therethrough which comprises the bore 56 through the knurled flange 53 and the bore 57 through the dial collar 51, which latter bore is of slightly greater diameter than but which is in axial alignment with the bore 56 through the flange 53.

The micrometer dial unit M is completed and assembled on and in operative relation with the spindle 30 and the index mark carrying bushing 33 by mounting and securing a bushing 58 on the spindle 30 with the micrometer dial member 50 and operating flange 53 thereof being mounted on the bushing 58 between a head or enlarged diameter flange 59 at the outer end of the bushing and the index mark bearing flange 34 of the bushing 33. Thus, the micrometer dial unit M is mounted and assembled on the bushing 58 between the crank handle 38 at the outer end of spindle 30 and the adjacent side 23b of the fixed vertical post 23 of the copy holder supporting arm unit 21.

The scale divisions 52 of the micrometer scale MS on the micrometer dial collar 51 extend to the inner peripheral edge of the collar for cooperative positioning relative to the index or zero mark 35 on flange 34 of the bushing 33 so that setting of the micrometer dial member on and relative to such index mark may be readily made with visual reading errors reduced to a minimum. In order to set the micrometer scale MS relative to the index mark 35, the operator releases the adjusting screw 55 and then rotates the dial member 50 until the desired scale reading is reached relative to the index mark 35 on the bushing flange 34. He may then thread the adjusting screw 55 inwardly into locking engagement with the bushing 58, after which the crank handle 38 may be rotated in the required direction to vertically move the copy table supporting column 24 on the post 23 through the precise linear distance as measured from the micrometer scale MS to accurately and precisely position the copy table P as required for the particular pattern or master and workpiece to be engraved therefrom. In this manner all guesswork and reliance solely on estimated adjustments in setting the position of the copy table P is eliminated and accurate and precise scale measured setting is made possible.

The copy table P is mounted and releasably attached in horizontally disposed position on and to the upper end of the table supporting column 24 for vertical movements as a unit upwardly and downwardly with the column under micrometer scale measured control of the micrometer dial unit M. In accordance with a feature of my invention the copy table support column 24 is provided at the upper end thereof with a horizontal copy table mounting base 60 which is formed in this example integral therewith and which projects horizontally outwardly from and beyond the outer side of the support column. The support column 24 in this instance increases in the width dimension thereof from the inner side to the opposite outer side of the column upwardly from the lower end thereof to the table mounting base at the upper end of the column. If desired, the forward side of the column 24 at the upper end thereof may be bulged or extended horizontally outwardly to form what is, in effect, a supporting buttress 60a. The table supporting base 60 of column 24 is provided with a centrally located vertical bore 61 therethrough in which there is mounted a table attaching screw or bolt 62 which extends upwardly above the base 60 and is externally threaded for attachment of the copy table P thereto in seated position on base 60. At the upper side of base 60 an upwardly extending, annular rib 63 is provided concentric with but spaced from and around the table attaching bolt 62. Spaced radially, outwardly from rib 63, concentric therewith and positioned around the outer side of the base 60 there is provided a similar rib 64 concentric with rib 63. If desired, an intermediate rib or ribs 64' may be provided on base 60. These annular ribs 63, 64 and 64' have their upper edges formed planar to lie in the same horizontal plane and to provide a series of radially spaced apart annular ribs. At one inner corner of the base 60, in this instance, the inner left-hand corner thereof when facing the support column 24, a vertical, upwardly extended post or abutment 66 is provided. The post 66 has its upper end formed to provide thereacross a horizontal planar seating surface 67 for engagement with and seating thereon of the copy table P. The post 66 is adapted to form a steady rest for the copy table P when the latter is mounted on base 60 to stabilize the table in precisely horizontal position against displacement.

Any suitable design or type of copy table P may be utilized for mounting and attachment on the base 60 of the support column 24. In the present example I have shown a copy table P which provides a flat planar upper surface 68 for receiving thereon a pattern or master, with the table having parallel transverse slots or grooves 68a thereacross with corresponding spaced parallel ribs 68b at the underside of the table. Centrally of the table P there is provided an attachment fixture or fitting 69 which is formed with a vertical tapped bore 69a for threading thereinto of the upper end of the table attachment bolt 62. The underside of fitting 69 provides a planar, annular surface 69b therearound for rotatable seating engagement on rib 63 of the mounting base 60. Th copy table P is also provided with a depending annular flange 65 on the under side thereof concentric with the axis of rotation of the copy table and having a diameter in this example such as to seat upon the annular rib 64 of the mounting base 60. The copy table P is releasably mounted in rigid position on and fixed to base 60 of the table support column 24 by threading the attachment bolt 62 into the fitting 69 on the underside of the table and then tightening up on the bolt until the fitting 69 and annular flange 65 at the underside of the table are seated on the planar, annular seating surfaces provided by the spaced annular ribs 63 and 64 and with the stability of the table horizontally insured by the seating of the under-surface of the table on the planar surface 67 of the steady rest 66 provided at an inner corner of the base 60. Thus rigidly mounted and attached the table is held with its upper pattern receiving surface in a truly horizontal plane for movements upwardly and downwardly as a unit with the support column 24 under micrometer scale measured movements of that column and the table on the fixed and rigid post 23.

It will be evident that various other embodiments, mechanical expressions, constructions, combinations and sub-combinations may be resorted to without departing from the broad spirit and scope of my invention, and hence, I do not desire or intend to limit and confine my invention in all respects to the exact and specific disclosures hereof as illustrated and described herein by way of example, except as may be required by intended specific limitation thereto appearing in any of the appended claims.

What I claim is:

1. In combination, a main base; a vertical column on and integral with said base extending upwardly from one side of the rear portion thereof; a sub-base on and integral with said main base position extending upwardly therefrom at one side of and integral with said vertical column; said sub-base extending horizontally forwardly across said main base to and terminating at the front end thereof; a horizontally disposed arm member rigidly attached to and extending forwardly from the front end of said sub-base in forward continuation thereof to a location spaced forwardly a distance outwardly from said main base; a vertically disposed post member integral with said arm member located at the forward end thereof spaced forwardly from said main base and said sub-base and extending a distance upwardly above said arm member; a table support column vertically slidably mounted on said post member of said arm member for movements upwardly and downwardly thereon constrained to a straight-line, perpendicular path of movement; a horizontally disposed table mounted on the upper end of said support column for movements therewith as a unit assembly; adjusting mechanism mounted on said post member in operative connection with said vertically movable support column for vertically adjusting said support column and table thereon as a unit assembly on and relative to said post member; and means for releasably locking said support column in any position of vertical adjustment thereof on said vertical post of said arm member.

2. In combination, a supporting base; a vertical column on said base extending upwardly therefrom; a sub-base integral with said supporting base extending along one side thereof upwardly therefrom and forwardly thereacross from front to rear thereof; a horizontally disposed arm member rigidly attached to and extending forwardly from the front end of said sub-base in forward continuation thereof to a location spaced a distance outwardly from said main base and said sub-base; a vertically disposed post member integral with said arm member located on the inner side of said arm member at the outer end thereof; said vertical post member extending upwardly a distance above said arm member; a table support column vertically slidably mounted on the inner vertical side of said post member and extending a distance upwardly thereabove; said support column extending laterally horizontally from said post member in position located opposite and spaced from and in forward alignment with said vertical column on said supporting base; a table mounted on the upper end of said support column in position disposed horizontally thereacross opposite and spaced forwardly from the forward side of said vertical column; adjusting mechanism on said post member in operative connection with said support column for vertically adjusting said support column and said table upwardly and downwardly as a unit assembly on and relative to said post member; and means on said post member in operative connection with said vertically movable table support column for releasably engaging and locking said support column and table thereon in any vertical position of adjustment of said support column on said post member.

3. In combination, a supporting base; a vertical column on said supporting base extending upwardly therefrom; a table supporting arm rigidly attached in fixed position to said supporting base and extending horizontally forwardly therefrom to terminate at its outer end spaced a distance forwardly from said supporting base; a vertically disposed post member in fixed position on the inner side of said arm at the outer end thereof and extending laterally inwardly across but spaced from said supporting base; the inner vertical side of said post member having a vertically disposed slideway thereon; a table support column slidably engaged on said slideway of said post member extending laterally horizontally therefrom in position opposite the forward side of and in general forward alignment with said vertical column; said support column being slidable vertically upwardly and downwardly on and relative to said post member constrained to a straight-line, perpendicular path by said slideway; and adjusting mechanism mounted on said post member in operative connection with said table support column for vertically adjusting said support column upwardly and downwardly on said post member relative thereto and to said vertical column.

4. In combination, a supporting base; an arm member rigidly positioned on said base and extending horizontally forwardly a distance from and beyond the front end of said supporting base; a vertically disposed post member on said arm member located on the inner side thereof at the outer end of said arm member in position with its vertical axis substantially perpendicular to the major horizontal axis of said arm member; a table support column vertically slidably mounted on the inner vertical side of said post member; a table mounted on the upper end of said support column in position disposed horizontally thereacross and movable vertically as a unit assembly therewith; adjusting mechanism for vertically adjusting said support column and said table thereon upwardly and downwardly as a unit on and relative to said post member; said adjusting mechanism including a manually operable actuating shaft rotatably mounted on said post member in horizontally disposed position extending outwardly from the forward side of said post member adjacent said vertically adjustable support column; and a micrometer dial unit mounted on said actuating shaft in a readily accessible and visible location at the outer side of said post member in operative connection with said actuating shaft.

5. In combination, a supporting base; a vertical column on and extending upwardly from said supporting base; a supporting arm rigidly positioned on and extending horizontally and forwardly from said supporting base at one side of said vertical column; said supporting arm extending a distance forwardly beyond said supporting base with its outer end located to one side of said vertical column; a vertical post member on the outer end of said supporting arm member at the inner side thereof; a table support column vertically slidably mounted on said vertical post member at the inner side thereof in position opposite and in general forward alignment with and spaced forwardly from the forward side of said vertical column; a table mounted on the upper end of said support column; adjusting mechanism for vertically adjusting said support column and said table thereon upwardly and downwardly as a unit assembly on and relative to said vertical post member; said adjusting mechanism including a horizontally disposed actuating shaft journaled in said post member and extending a distance outwardly beyond the outer, forward side thereof opposite said vertical column; said actuating shaft extending into said post member with the inner end of said actuating shaft housed within said post member; a vertically disposed elevating screw rotatably mounted on and extending through said post member; means rotatably connecting said elevating screw in driven connection with said actuating shaft; an actuating nut mounted on the inner side of said support column in operative engagement with said elevating screw within said post member; said post member at the inner side thereof providing a vertical opening therethrough receiving said nut member for vertical displacement thereof with said support column independently of said post member by rotation of said elevating screw; and an operating handle member mounted on the outer end of said actuating shaft in position at the outer side of said post member opposite said vertical column and to one side and clear of said support column.

6. In combination, a base; a vertical column on said base extending upwardly on one side thereof; a table supporting arm rigidly supported from said base at the side thereof opposite said vertical column; said table supporting arm extending horizontally forwardly from and a distance outwardly beyond the forward end of said base; a vertical post member on said table supporting arm located at the outer end thereof extending a distance upwardly above said supporting arm; a vertically disposed table support column slidably mounted on said vertical post member for movements upwardly and downwardly thereon constrained to a straight-line path normal to the plane of said base; a table mounted on the upper end of said vertical support column and movable upwardly and downwardly therewith as a unit assembly; said support column located on said vertical post member in position opposite the front side of said vertical column in general forward alignment therewith; mechanism for selectively adjusting said support column and copy table as a unit upwardly and downwardly on said vertical post member; a micrometer scale dial unit rotatably mounted in position at the forward front side of said vertical post member; said micrometer scale dial unit being operatively connected with said adjusting mechanism for rotation thereby for visually measuring therefrom the linear distances of vertical travel of said support column and said table; said micrometer scale dial unit being located at the front side of said column support to one side and clear of said support column; and an index marker on the front side of said post member in position in visual reading proximity to said micrometer scale dial unit.

7. In the combination defined by claim 4, a horizontally disposed bushing mounted in said post member with its outer end at the exterior of said post member and being formed with a radially outwardly disposed flange therearound; said actuating shaft of said adjusting mechanism being journaled in said bushing; an index mark on said flange of said bushing; an operating handle fixed on the outer end of said actuating shaft; said micrometer dial unit including a micrometer dial collar having a cylindrical dial surface therearound concentric with the axis of said collar; said dial collar being mounted on said actuating shaft between said bushing flange and said operating handle for rotation on and independently of said actuating shaft; a micrometer scale on and around said dial surface in visual reading proximity to said index mark on said bushing flange; and means for releasably locking said micrometer dial collar to said actuating shaft.

8. In combination, a main base; a vertical column on said base extending upwardly from one side of the rear portion thereof; a vertically adjustable knee member mounted on and supported from said base in position in front of said vertical column; a worktable mounted on said knee member; a copy table supporting arm mounted on and supported from said base along the side thereof opposite said vertical column and said knee member; said supporting arm extending horizontally forwardly across said base to and outwardly a distance beyond the front end of said base; a vertical post member on said supporting arm located in position thereon at the outer end thereof; said post member being positioned by said supporting arm opposite the outer side of but spaced a distance outwardly from said knee member; said post member extending a distance upwardly above said supporting arm; a support column slidably mounted on the inner side of said vertical post member for vertical movements upwardly and outwardly thereon; said support column being positioned extending inwardly from and across but spaced forwardly from and in general forward alignment with said knee member; a table mounted on the upper end of said support column in horizontally disposed position in general forward alignment with said knee member; and mechanism mounted on said post member in operative connection with said support column for vertically adjusting said column and said table mounted thereon as a unit assembly upwardly and downwardly relative to said knee member and said worktable mounted thereon.

9. In combination, a supporting base structure; a vertical post member supported from said base structure; a vertically disposed support column slidably mounted on said vertical post member for vertical movements upwardly and downwardly thereon constrained to a straight-line, perpendicular path of movement; said support column being provided with a horizontally disposed outwardly extending copy table mounting base on the upper end thereof; said mounting base being provided on the upper side thereof with a generally horizontally disposed surface thereacross; said mounting base being formed on the horizontal upper side thereof with radially spaced concentric, annular copy table surfaces thereon disposed in a plane spaced above the plane of the horizontally disposed upper surface of said base substantially normal to the straight-line path of vertical movements of said support column on said vertical post member; a copy table attaching member on said mounting base positioned approximately coaxial with the common vertical axis of said annular seating surfaces for releasably attaching a copy table in rigidly fixed position seated on said annular seating surfaces of said mounting base; and said mounting base being provided with an upwardly extending abutment member thereon located at an inner side thereof adjacent said vertical post member and providing thereon across the upper end thereof a horizontal seating surface disposed in a plane above the horizontal plane of said annular seating surfaces for seating engagement thereon of a copy table mounted in position attached on said mounting base by said copy table attaching member.

References Cited in the file of this patent

UNITED STATES PATENTS

| | | |
|---|---|---|
| 1,339,984 | Runge | May 11, 1920 |
| 2,074,095 | Sassen | Mar. 16, 1937 |
| 2,303,956 | Rossbacher | Dec. 1, 1942 |
| 2,356,300 | Boettcher | Aug. 22, 1944 |
| 2,626,540 | Eserkaln | Jan. 27, 1953 |
| 2,666,366 | Zwick | Jan. 19, 1954 |